Nov. 30, 1926.

A. E. OSWALD

ELECTRIC MOTOR

Original Filed Nov. 30. 1920   4 Sheets-Sheet 1

Inventor:
Alfred E Oswald
by B C Stickney
Atty

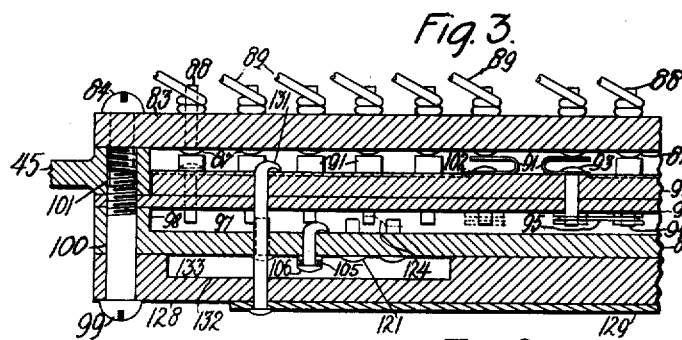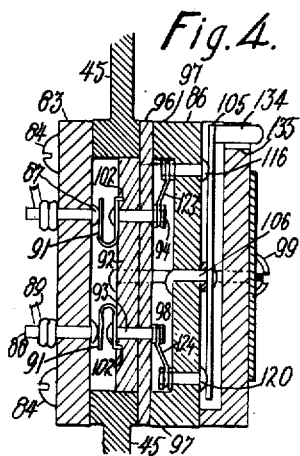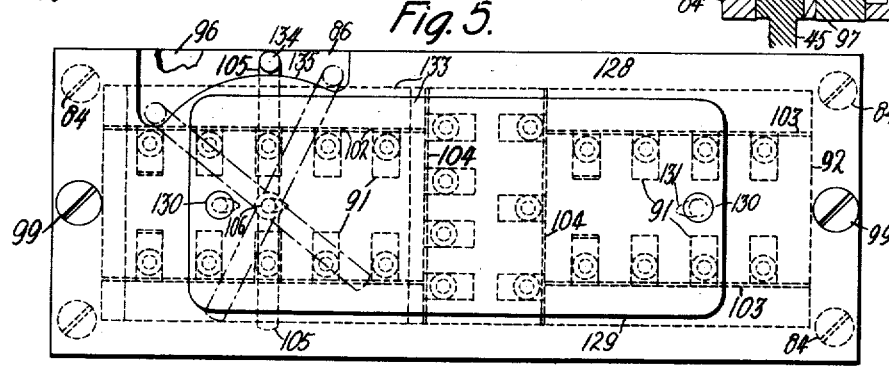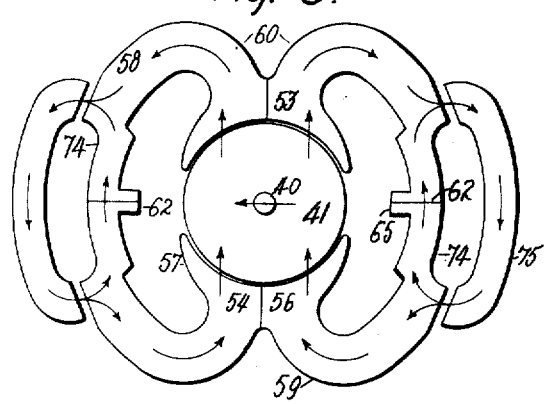

Nov. 30, 1926.

A. E. OSWALD 1,608,613

ELECTRIC MOTOR

Original Filed Nov. 30. 1920   4 Sheets-Sheet 3

Inventor
Alfred E. Oswald
by
B. C. Stickney
Attorney

Inventor:
Alfred E Oswald
by B.C.Stickney
Attorney.

Patented Nov. 30, 1926.

1,608,613

UNITED STATES PATENT OFFICE.

ALFRED E. OSWALD, OF BOGOTA, NEW JERSEY, ASSIGNOR TO UNDERWOOD TYPEWRITER COMPANY, OF NEW YORK, N. Y., A CORPORATION OF DELAWARE.

ELECTRIC MOTOR.

Original application filed November 30, 1920, Serial No. 427,346. Divided and this application filed December 7, 1921. Serial No. 520,488.

This invention relates mainly to novel means for varying the speed of an alternating current commutator motor at will.

An alternating current commutator motor usually has the armature coils in series with the field coils, their magnetic fields being kept in phase on account of the series connections; but if the load is diminished the speed of the motor tends to increase. Therefore, where substantially constant speed is desired, it is the practice to employ induction motors; but in these the speed depends upon the frequency of alternations, circuits of different frequencies requiring different motors.

It is an object of the present invention to regulate the speed of an alternating motor, and to maintain the speed substantially constant for the rate at which it is set, whether with or without load, or for various loads.

In securing this result I employ a commutator in an alternating current motor, the commutator connecting the rotating armature in series with certain auxiliary coils, that I employ which may be stationary. The field coils, however, preferably, I connect in long shunt across the voltage-supply mains. Fluctuation in speed of the motor is substantially regulated by means of a novel relationship between the field coils and said auxiliary coils. Regulation of the speed may be secured at will by effecting certain alterations in the relationship between the field coils and the auxiliary coils.

There will first be explained the means for keeping the motor speed substantially constant, and then the means for regulating the speed as required from time to time.

The same iron magnet ring or core may be used for both field and auxiliary coils, and the winding is such that the field coils are electrically opposed by the auxiliary coils. This arrangement of coils on a common magnet core may resemble in some respects the arrangement of an ordinary transformer, and, as in a transformer, the opposing coils may affect each other in some respects, although, unlike a transformer, the coils are all connected to the same mains, the field coils being connected in long shunt across the voltage-supply mains, and the auxiliary coils connected in series with the armature.

I use a modified form of endless magnet core, the coils on which are arranged to offer less inductance than would exist in an ordinary straight bar magnet core. The auxiliary coils are preferably wound around said core at points equidistant from the field poles; the auxiliary coils being wound so as to oppose the current in the field coils, the magnetic circuits not being completed through said iron core. If nothing further were done with the core, the magnetic flux would meet with such great resistance in completing its return through the air, that the inductance of the coils combined would be substantially or nearly zero; and hence there would be too great a flow of current through all the coils. Therefore to reduce said reluctance of the magnetic circuits, I provide the main core with branches or loops of iron extending partly around the auxiliary coils, whereby the magnetic circuits are made more nearly complete of metal, and some inductance is preserved. The magnetic circuit for each auxiliary coil includes one of the branches or loops, and also includes that part of the main core around which the auxiliary coil is wound; while the magnetic circuit for the field coils consists partly of the main core and partly of said branches or loops. In said loops, the direction of flow of the magnetic flux is one and the same for the coils which oppose each other.

In order to prevent the inductance from being too great, and in order, moreover, to have the oppositely working coils react properly upon each other through the main core, the magnetic circuits through the loops are left incomplete; said loops resembling keepers and being preferably provided with air gaps, which serve as magnetic impediments, which are less than would exist if said loops were not provided. The inductance is kept down to the desired point, but not below it, and sufficient reaction of the oppositely working coils upon each other through the main core is secured, and results in the phasing of the circuits, whereby it is desired to secure speed-regulation of the armature. Since each gap or other impediment is placed in a loop, and since each loop is included in two magnetic circuits, the effect of the gap is the same upon one magnetic circuit as upon the other. These gaps are preferably made in the core loops at the points where they branch from the main core or ring.

Since the gaps offer the same resistance to the field magnetism that they offer to the armature circuit magnetism (excited by the auxiliary coils), said gaps conduce to the preservation of a balance between the oppositely working coils, or provide a connecting link to hold the two circuits in phase. In other words, by providing the same magnetic resistance for the auxiliary coils that is provided for the field coils that are in parallel therewith, it results that the auxiliary coils and the field coils tend to work in unison. Each may react upon the other equally, or is linked to and controlling of the other through the main core. This is rendered possible by the gaps in the core loops, so that each magnetic flux is deprived of an easy return path, when slightly out of phase, and hence reacts upon the other magnetic flux in an effort to keep the two circuits in phase.

If the air gaps were not present at the core loops, then the inductance would be so great that the torque of the motor would be weakened. Therefore, this provision has been devised for holding the motor coils in phase after the desired speed is reached. It holds them in phase because some of the magnetism reacts upon each of the coils through the common core, when not in phase; while all the magnetism passes through the air gaps when in phase, also decreasing the inductance of the circuit.

Increasing speed of the armature reduces inductance, and hence more current is taken through the armature circuit, including the auxiliary coil in series therewith. Hence magnetism is excited in the auxiliary and armature coils prematurely or somewhat in advance of the corresponding magnetism excited in the field of the motor; but this discrepancy in phase cannot possibly progress beyond a limited extent. The current in the main field lags, because only one circuit is affected by the increasing speed of the armature. This over-speeding therefore tends to throw out of phase the currents of the field and the armature coils, and thereby impair the force of the magnetic attraction, which grows less and less as they get more out of phase. The two circuits would tend to get so far out of phase that the magnetism of the armature coils would be so far out of synchronism with that of the field circuit as to unduly reduce the torque or rotative power of the motor. In other words, the rotative effect of the magnetism would diminish because corresponding magnetisms would not be produced in the armature and field synchronously. The speed of the armature would slacken until the reduction in the current passing therethrough would bring the magnetism of the armature again into step with that of the field. Thus variations in speed of the motor are inherently or automatically confined within narrow limits at about the point that is predetermined by the construction of the mator.

When the magnetism of the armature coils is out of phase with the magnetism of the field coils, an interference of the one with the other is set up in those portions of the core that are common to the field coils. This interference tends generally to weaken and pull out of phase the magnetic attraction and repulsion of the motor, and thereby to reduce the torque. When the opposing coils on the common core are out of phase, they tend to get into proper phase again, that is, through the common core and not the air gap. A self-corrective tendency exists, the field coils acting upon the auxiliary coils, and vice versa, in a manner to tend to bring them back into phase and thereby increasing the torque. This corrective tendency is also favored by the reduction of the speed to normal and consequent increase of the induction in the auxiliary coils to normal, so that when the armature speed falls back to normal, a strong torque is secured. Thus the opposing coils tend to come into phase with each other, and the armature simultaneously tends to change speed, thereby bettering the condition which made the coils out of phase.

It is also noted that a tendency of the armature to over-speed and thereby reduce the inductance, has the effect of permitting more current to flow from the mains through the armature circuit, and as a result more current flows from the mains through the field circuit, the condition being analogous to that in a transformer.

Coming now to the manual control of the speed, there is used a multiplicity of the auxiliary coils; preferably eight. Co-operation of all or part of these with the field coils, may be secured, by shifting the connections, whereby the desired number of auxiliary coils may be cut in or out.

In considering regulation of speed, it should be kept in mind that the auxiliary coils are opposed to the field coils. If the auxiliary coils were omitted, the armature would rotate in one direction under the influence of the main field coils; whereas, if the main field coils were omitted and the auxiliary coils were retained, the armature would be rotated in the opposite direction under the influence of the auxiliary coils. In other words, the tendency of the main field coil is to rotate the armature in one direction, while the tendency of the auxiliary coils is to rotate the armature in the opposite direction. When these opposing tendencies have a certain relationship, the motor automatically maintains a certain speed, for reasons (lead or lag existing between the two circuits) hereinbefore given. If a higher speed is desired, then the number of turns in the auxiliary coils may be decreased, thus reducing the opposition to the main field coils, so that the armature is rotated more rapidly in the same direction. Thus, by cutting out or cutting in more turns in the auxiliary coils the speed of the motor may be varied. After such adjustment, the motor inherently or automatically increases or diminishes in speed until the auxiliary coils again reach the proper balance or relationship with the main field coils. At any rate for which the motor may be designed to run, its speed will be kept substantially finely governed by utilizing the lag and lead of the field circuit relatively to the armature circuit, as hereinbefore explained.

For cutting in and out the auxiliary coils, and thereby changing the speed of the motor at will, there is preferably employed a multiple switch-board, having a contact-lever whereby all of the auxiliary coils may be connected in series, to give a maximum opposition to the field coils and thereby reduce the speed of the motor to the minimum, and whereby, whenever desired, two, four or six of the auxiliary coils may be cut out, increasing the speed accordingly. When only two coils are left in the series, maximum speed is secured. The speed will remain substantially constant by the regulating switch.

In the preferred form of practicing the invention, this switch, together with the terminals of the auxiliary coils, is placed upon a board, which is fastened upon the motor and carries a full set of contacts for the different coils, the armature, etc. This board may be double, or comprise two members or plates, upon one of which are arranged the necessary permanent contacts, having appropriate permanent connections with the various coils in the motor. The other plate is removable, and carries the switch. Since the motor has the permanent contact plate embodied therein, it is only necessary to screw on the switch plate, having not only the switch but also contacts for the various other coils, whereupon the motor is ready for use. The desired speed may be secured by merely selecting the removable contact plate or switch suitable for that speed and applying it to the permanent contact plate. The invention is illustrated in connection with the form of universally convertible motor disclosed in my pending United States application, No. 427,346, filed November 30, 1920 (now Patent No. 1,554,647, dated September 22, 1925), in which motor there is provided a permanent board or plate on which is arranged a fixed set of terminals for the different coils, the armature and the resistance.

Upon a separate board or plate attached thereto and removable therefrom, as described in said application, are arranged the necessary contacts having appropriate connections for the work in hand. Each removable contact plate may be marked to indicate the work that will be performed by the motor when said plate is fastened thereto. An assortment of these removable plates may be kept in stock, so that when a dealer receives an order for a motor for either alternating or direct current, and for a certain frequency and a certain voltage and speed, he needs only to select the plate which is marked for such current, frequency, voltage and speed, and secure the same upon the motor, whereupon it is ready for the customer's use. Where the owner of a motor has occasion to use the same in a different circuit or for different range of speed or frequency, etc., he needs only to secure from the dealer an appropriate plate and substitute it for the old plate on the motor, whereupon it is ready for use in the new environment. When the user has to employ the motor in a variety of circuits, as in the case of a portable machine, he may purchase a motor with a complete set of contact plates, so that he can use it under all ordinary conditions. The connections are made automatically, by fastening the appropriate contact plate in position, whereupon the contacts make the necessary connections. An unlimited number of combinations may be set up, as explained in said application.

It will thus be seen that the improved removable plate disclosed herein may be used alone, or may if desired form one of such a set of plates that may be in the possession of the user of the alterable motor, or that may be kept in stock by the manufacturer of the motor, for supplying a variety of requirements. It will thus be seen that at small expense and by simple and satisfactory means the adaptability and usefulness of the motor may be substantially increased by the use of the interchangeable novel speed-regulating switch plates.

Other features and advantages will hereinafter appear.

In the accompanying drawings,

Figure 3 is a section taken horizontally and longitudinally through the contact plate.

Figure 4 is a vertical section of the contact plate, being on a larger scale than at Figure 2.

Figure 5 is a side elevation of the contact plate.

Figure 6 is a diagram of the cores of the feeding magnets and auxiliary magnets used in the motor.

Figure 7:
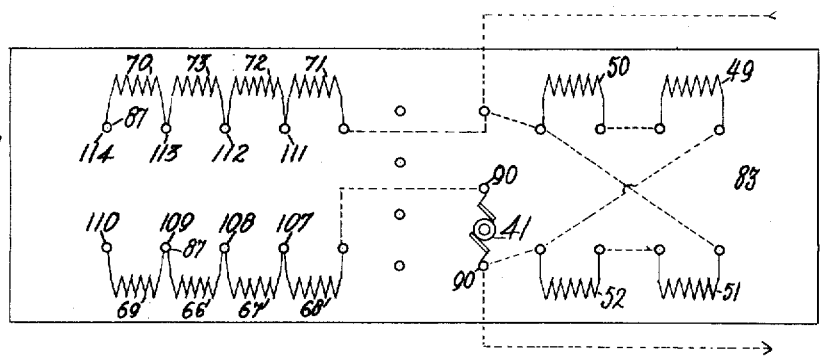
Figure 8:
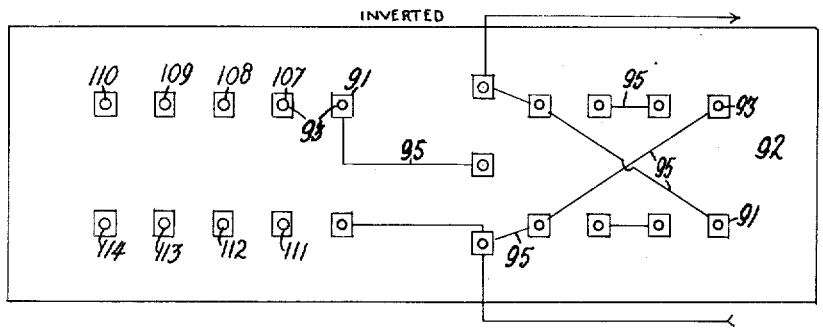
Figure 9:
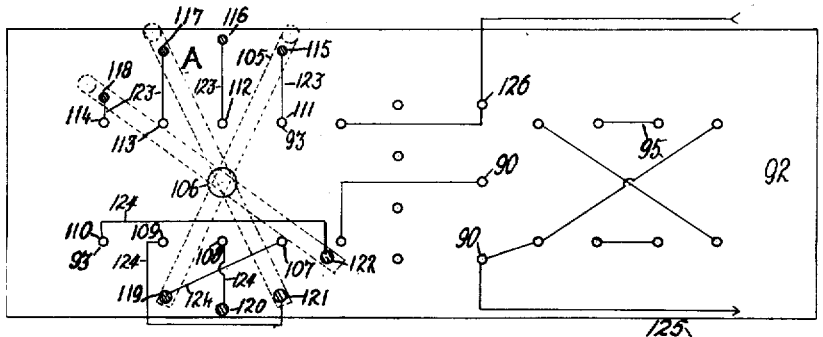
Figure 10:
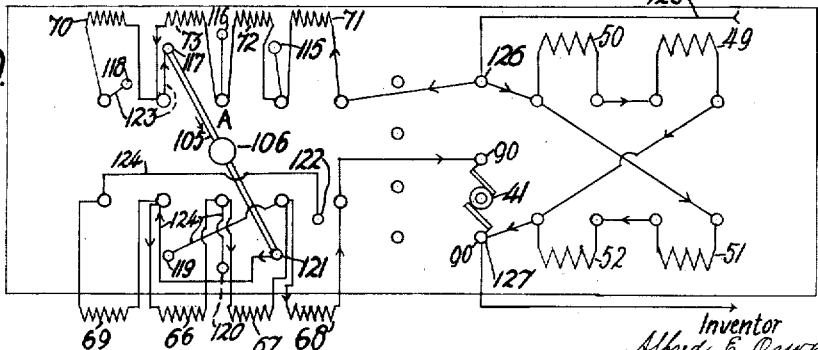
Figure 11:
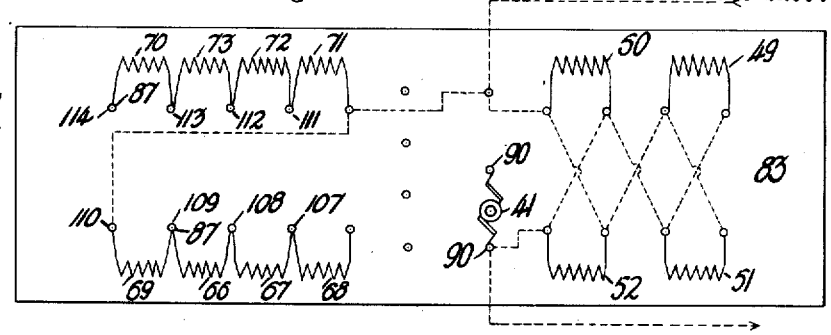
Figure 12:
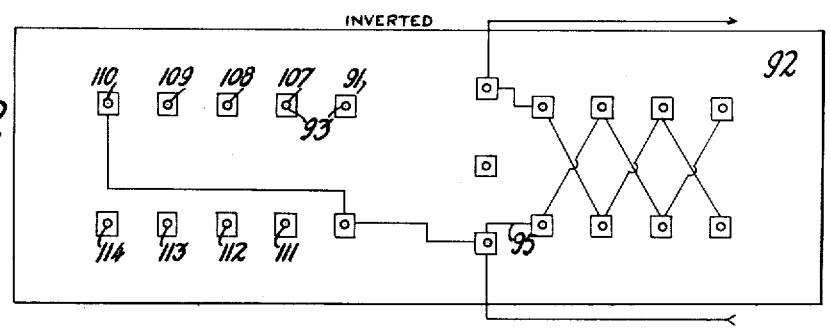
Figure 13:
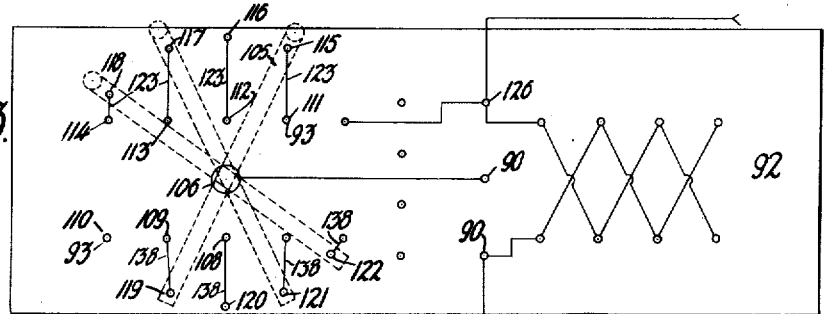

Figures 7 to 10 are diagrammatic views to show how the circuits are built up. Figure 7 shows in full lines the connections within the motor. Figure 8 is an inverted view of a detachable contact plate which co-operates with the terminals seen at Figure 7, to build up circuits as indicated in dotted lines in Figure 7, and in full lines in Figure 8. Figure 9 is a view of the other side of the plate seen at Figure 8, indicating diagrammatically the same circuit leads and also showing the leads which extend from some of the terminals to a set of switch terminals, the latter shown in section. Figure 10 shows the complete circuit built up by the parts shown in Figures 7 to 9.

Figures 11 to 14 show diagrams similar to Figures 7 to 10, but with the field coils arranged all in parallel, and with one set of auxiliary coils arranged in parallel with the other set.

The motor shaft is seen at 40, carrying an armature 41, comprising standard windings 42 suitable for alternating current, or fewer than would be the case with a corresponding direct current motor. The laminated core of the armature is indicated at 43. Said shaft is journaled in bearings 44 carried by spider-like heads 45 of the framework, which also comprises a barrel, drum or casing 46. The armature is provided with a commutator 47 to cooperate with brushes 48.

The field coils are marked 49, 50, 51, 52, preferably two at each pole of the magnet, and capable of being connected in either series or parallel at each pole. The opposite poles are marked 53, 54, and these project inwardly from a magnet core which is designated generally as 55, and which is roughly of annular or endless form. The pole pieces extend from neck portions 56 provided upon the magnet core, and said coils 49—52 are arranged at said neck portions. They are divided into sub-coils or portions, as shown, and each portion is placed with one of its sides occupying a position between the horn 57 of the pole-piece and the body portion 58 of the magnet core; said portion 58 connected by a bend 59 to the neck 56, and the field coil extending around the bend and occupying a notch or cut-away portion 60, which is formed in the magnet core at the occurrence of the bends 59.

Figure 2:
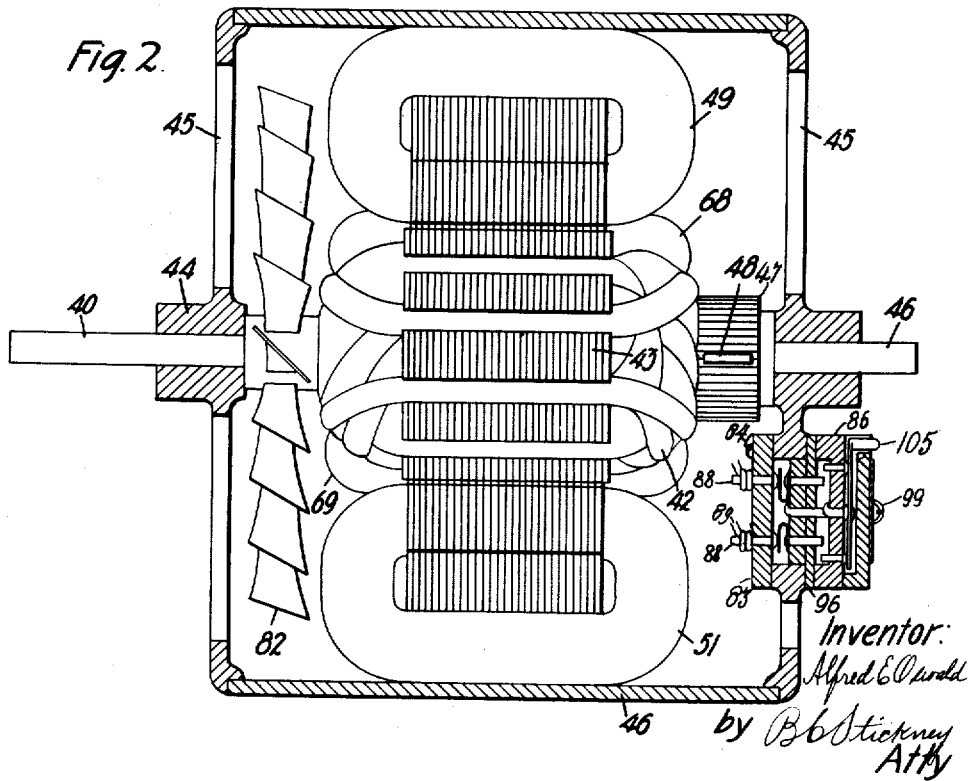
Figure 2 is a longitudinal section showing the motor and the contact plate attached thereto and having a speed-changing switch.

Each of the coils 49—52 is preferably in the form of an elongated loop, Figure 2, and may be wound separately and placed as a unit upon the magnet core, which, for this purpose, may be made of four quadrants, segments or portions, one of which is seen at Figure 6. These portions are preferably alike, four of them completing the magnet core. The coils 49, 50, 51, 52 may be slipped over the neutral ends 62 of the quadrants before the latter are assembled in the casing 46; the assembled magnet core and coils being inserted endwise in said casing, and the quadrants being additionally fastened by tubular clips 64, which fit over contiguous lugs 65 formed on the adjoining quadrants at their neutral ends, one clip for all the lugs at each side of the motor. These tubular clips may be made of copper or brass enclosing laminated iron 64ª, and may project close to the armature, to form interpoles.

This division of the field windings into two coils at each pole of the magnet favors the proper operation of the motor with alternating current, inasmuch as the magnetism generated by the two coils may be equal, and hence the bodies of the magnets extending in opposite directions from said coils may be equally affected, thus assuring proper co-operation or balance of the field coils 49—52 with respect to the auxiliary coils, which are designated as 66 to 73 and are placed midway between the pole pieces of the magnet. A certain amount of separation of coils 49—50 and 51—52 is secured by placing them around the bends 59, this separation tending to favor the working of each coil with respect to the auxiliary coils, without undue interference from the other field coils.

Figure 1:
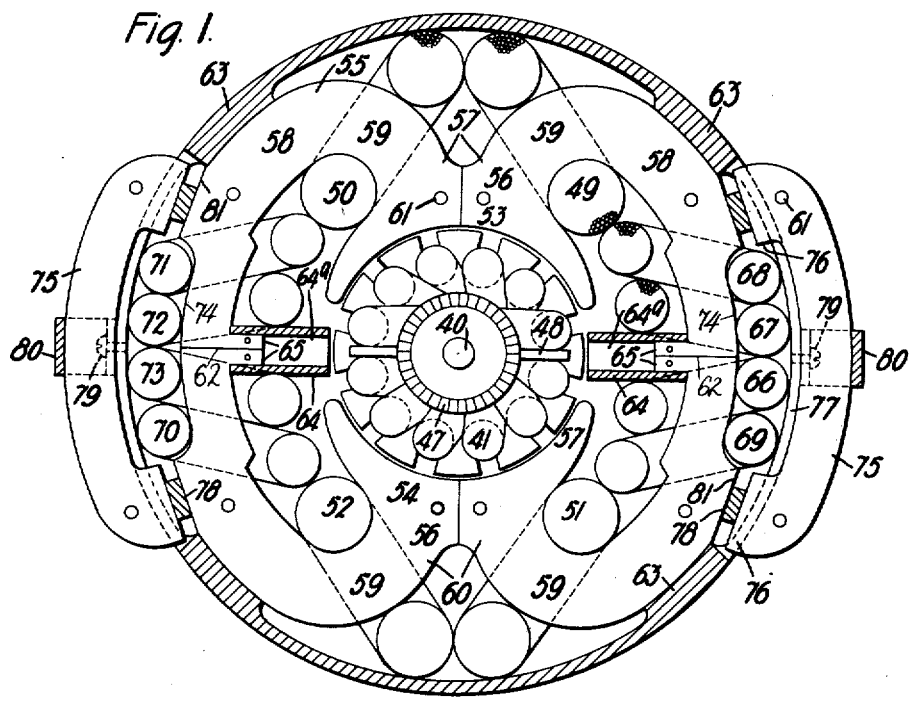
Figure 1 is a sectional elevation of a motor to which the present improvements are applied in one form.

The auxiliary coils 66, 67, 68, 69, at one side of the motor, may be formed separately and placed as units over the sections of the magnet before they are assembled in the motor and the same is true of the auxiliary coils 70, 71, 72, 73 in the opposite side of the ring. These auxiliary coils have many windings and are bulky, and the quadrants or segments may be cut away at 74 to give room for the coils within the cylindrical casing 46, see Figure 1; the four coils at their outer portions being confined in the recess formed by the adjoining cutaways 74. At their inner portions the coils may be confined between the tubular clips 64 and the field coils 49—52.

When the motor is used for alternating current, the auxiliary coils 66—73 taken together form in effect the middle or neutral portion of the annulus into two separate magnets, which works against the four magnets formed by the field coils 49—52, so that the annulus comprises six magnets; return paths for the magnetic circuit being provided by laminated iron loops or by-passes 75 in the form of keepers, which may be conveniently mounted outside of the cylindrical motor casing and provided with projections 76 that extend within slots 77 formed in the casing, and they may be held against wooden or other non-magnetic insertions 78 by means of screws 79 and straps 80, the straps passing across the laminations of the keepers and the screws being threaded into the casing. Adjustment of the keepers may be towards and away from the annular magnet, and may be secured by substituting thinner or thicker insertions 78 and tightening up the screws 79. The space between the projections 76 may be opposite to the recesses 74, and the annular magnet may have faces 81 parallel with and opposite the projections 76 or matching the same, so as to make it convenient to secure just the right air or other gap between the main magnet and the loops or keepers, which themselves form separate magnets, although only affording a return for the magnetism of the annular magnet. Upon the shaft may be provided, if desired, a fan 82.

At Figure 3 is shown a section of a terminal plate 83 of insulating material secured upon the inner side of the head 45 by means of screws 84; the terminal plate 83 being well within the head, so as to accommodate the corresponding contact plate or block 86, which is removable. The terminals are in the form of heads 87 formed on posts 88 which are connected to the ends 89 of the various circuits. The arrangement of the terminals is seen at Figure 7, which also shows a diagram of the coils, etc., the commutator terminals being indicated at 90. Appropriate contacts 91 (Figures 3 and 5) depend from the contact plate, which comprises an insulating block 92 to which they are secured by brass rivets 93, the ends 94 of which may be electrically connected by wires 95 in various ways to meet various requirements. The block 92 may be secured to the bottom of a plate 96, Figure 3, which, together with the cover plate 86, may form a box having sides 97 and ends 98 to contain the wires 95 and heads 94. Screws 99 may pass back through holes 100 in the cover plate 86 and the bottom plate 96 and thread into holes 101, Figure 3, in the head 45 of the motor casing for detachably securing the contact plate in position with the contacts engaging the appropriate terminals 87.

As one example of the various internal connections that may be made in the motor, there is shown at Figures 7 to 10 the manner of connecting for alternating current 110 volts, 30 cycles. It will be seen that the field coils are divided into two sets of two coils each, the coils in each set being in series while the sets themselves are in parallel. While there may not be great ohmic resistance from putting the sets of coils in parallel, still there is enough inductance, due to low frequency. If all field coils were in series relation to each other too much inductance would be produced due to low frequency.

A diagram of the connections so far described is seen at Figure 7, and Figure 8 (which shows the contact plate 92 inverted) gives the arrangement of contacts 91 therefor. It will be understood that this is only one of many arrangements of contacts that may be made up in adapting the motor for different conditions, as set forth in said application, and Figure 5 (which is not inverted) gives in dotted lines the locations for all such contacts. Each of them may have a nib 102, and these nibs may fit into longitudinal scores or grooves 103 and transverse grooves 104 formed in plate 92, to hold the contacts against rotative or other displacement.

Upon the outer face of plate 86 may be mounted a speed-controlling switch lever 105, pivoted between its ends at 106, and serving to enable the user to determine how many of the auxiliary coils (which are arranged in sets, the coils of each set being in series as at Figure 7) shall be effective. At Figure 10 auxiliary coils 69 and 70 are cut out of the circuit by the adjustment of said lever 105, so that, owing to the reduced opposition offered by auxiliary coils to field coils, the motor does not run at its lowest speed. It will be understood that one auxiliary coil is cut out of each side of the motor at Figure 1, as it is desired that the two sides should balance. Terminals 87 and 93 indicated as 107, 108, 109 and 110 for the auxiliary coils 66—69 may be arranged oppositely from terminals 87 and 93 indicated as 111, 112, 113 and 114 for the auxiliary coils 70—73. It will also be seen that lever-contacts 115, 116, 117 and 118 (connected by leads 123 to terminals 111—114) are opposed respectively to lever-contacts 119, 120, 121 and 122 (connected in inverse order by leads 124 to terminals 107, 110), and that, in shifting about its pivot, each step of the switch-lever cuts in or out a pair of coils; these positions of the lever being shown at Figure 9. These eight switch terminals are seen at Figures 9 and 10 connected by these short leads 123 and 124 to the corresponding auxiliary-coil contact-pins 93 in plate 92.

Figures 7 to 10 are diagrams of the terminal system. Figure 7 represents in full lines the terminals on plate 83, which are permanently connected to the various coils in the motor and armature. The remaining Figures 8 to 10 are diagrammatic views of the attachable contact plate. Figure 8 shows the plate 92 in detached, inverted position, to disclose the contacts 91, which engage the terminals 87 and effect the connections which are indicated by dotted lines in Figure 7. It will be seen at Figure 8 that certain of the contacts 91 or terminals 93 are connected by wires 95, corresponding to the wires seen in dotted lines in Figure 7.

It will be seen by comparing Figure 7 and 8 that the wiring is complete, except that connections are lacking from one series of auxiliary coils across to the other series. This cross connection is effected only by lever 105, and Figure 9 shows diagrammatically the plan of plate 92; that is, Figure 9 gives a view of one side of the plate and Figure 8 of the other side; the wiring 95 being also indicated diagrammatically at Figure 9.

At Figure 9 are also shown in section the switch-terminals 115 to 122 with which the ends of the lever 105 may contact, as seen at Figure 9, thus effecting a variety of connections from the auxiliary coils in one series to those in the other series, thereby cutting in and out different numbers of coils.

When the lever 105 is in the position marked A, at Figures 9 and 10, the two auxiliary coils 70 and 69 are cut out, so that the motor runs somewhat above its lowest speed, inasmuch as the tendency of auxiliary coils to oppose the field coils is now reduced. It will be understood that, when said lever is at the extreme left-hand position, connecting terminals 118 and 122, as seen at Figure 10, all of the auxiliary coils are cut in, and hence the motor runs at its lowest speed.

When said lever is in a vertical position (indicated at Figure 5), it connects terminals 116 and 120, whereby auxiliary coils 70, 73, 69 and 66 are cut out. With so many coils cut out, the opposition to the field coils is so greatly reduced that the motor runs nearly at its highest speed. When the lever is swung to the extreme right-hand position, Figure 10, and connects terminals 115 and 119, all of the auxiliary coils are cut out except 71 and 68, so that the motor runs at its highest speed. There need be no provision for cutting out coils 71 and 68, as it is always desirable to keep at least these two coils cut in, thereby maintaining uniformity of speed and gaining the other advantages pertinent to auxiliary coils.

When one end of the lever 105 is swung from one terminal to the next, thereby cutting out a coil in one series, its other end has a corresponding swing, thereby cutting out a coil in the other series, so that two coils are cut out or cut in at each such shift of the lever. It is also desirable for the operating coils in each series to balance those in the other series; oppositely-arranged coils 71 and 68 being always in, 72 being cut out or in at the same time with 67, 73 with 66, and 70 with 69. This gives the desired balance or effect in connection with the operation of the motor. In order to secure this result, notwithstanding the shifting of the ends of the lever in opposite directions, there is provided an inversion of the order of the connections 124 between the terminals 107—110 on plate 92 and the switch terminals 119—122 on plate 86, as indicated at Figure 9.

At Figure 10 is indicated the course of a current when the complete converting device is attached to the motor and the level 105 is swung to the A position. The current may be regarded as entering at 125 and dividing at terminal 126. Part of the divided current passes through the field coils 50, 49 and the other part of the divided current passes through 51 and 52. Both parts then pass to terminal 127 and thence to the main. From 126 the remainder of the divided current passes through auxiliary coils 71, 72 and 73 to terminal 117, and thence through lever 105 in position A to terminal 121, thence through auxiliary coils 66, 67, 68 to the armature 41 and to terminal 127 and thence to the main.

A housing for the switch 105 may be provided by a plate 128, which may serve as a cap plate for the contact plate, and may carry a name plate 129 to designate the cycles, voltage and other data relative to the motor; this plate 129 being secured by rivets 130, which hold together all the plates in the detachable device, namely, 92, 96, 86, 128 and 129. These rivets are preferably headed at their outer ends and clinched over at their inner ends, as at 131. The plate 128 has an undercut portion 132 to form a clearance or housing 133 for the lever 105. The lever may have a finger-piece 134 to project up above the top of the contact plate. Figure 4, the plate 128 being cut away at 135 to accommodate the movement of said finger-piece. The screws 99 pass through plate 128 and hold the entire device detachably upon the motor. Upon removing these screws 99, the contact plate may be removed, and another one substituted, to adapt the motor for different current, or work or speed; and the substituted device may or may not have a switch 105, etc., or other means for changing speed at will. The switch, lever or speed-changer 105 may be used in connection with other combinations of field coils, etc.

It will be understood, as set forth in said application, that the field coils can be connected across the mains in either series or parallel relation, and that the connection of the auxiliary coils can be changed to correspond with any such relation of the field coils, so that they co-operate with the field coils and the armature to regulate the speed of the motor, and that the lever 105 may still be employed for cutting out one or more auxiliary coils from each series, for increasing the speed of the motor to the extent desired. Such re-connection of the coils may be effected by the use of appropriate contacts and wirings, which may be made upon a substitute plate such as 92, 96, and such substitute plate may also carry a plate 86 and lever 105, thus forming a contact plate which may be substituted bodily for the one illustrated; and the user of the motor may provide himself with a large number of other contact plates, several of which may have speed-changing levers 105, and any contact plate, whether with or without a speed-changing lever, may be readily substituted in the motor.

Figures 11 to 14 correspond with Figures 7 to 10, but show another contact plate having suitable contacts and wiring for alternating current, 60 cycles, 130 volts, or 120 cycles, 260 volts, or 30 cycles, 65 volts. In Figures 11 to 14, the field coils are connected separately across the line or in parallel, to make it suitable for 130 volts, 60 cycles. To trace the connection of the field coils, at Figure 14, it will be seen that the current coming in from main 125 passes through coil 50 and returns through diagonal wire 127 to the other main 128. Again, the current flows from main 125 through diagonal wires 129, 130, to coil 49, and returns through diagonals 131, 132 and 127, to main 128. Again, the current passes through main 125 across the diagonal 129 to coil 52 and thence back to the main 128. Current also flows through 125 and through diagonals 129, 130 and 133 to coil 51 and then through diagonals 132 and 127 to the main 128. The set of auxiliary coils 70, 71, 72, 73 has a series arrangement, and the same is true of the auxiliary coils 66, 67, 68 and 69. One series is therefore in parallel with the other series of auxiliary coils; and, by means of lever 105, an auxiliary coil may be cut out of each set simultaneously, or two coils may be cut out, or three, from each set; one coil always remaining connected in each set, as in the arrangement at Figures 7 to 10.

Figure 14:
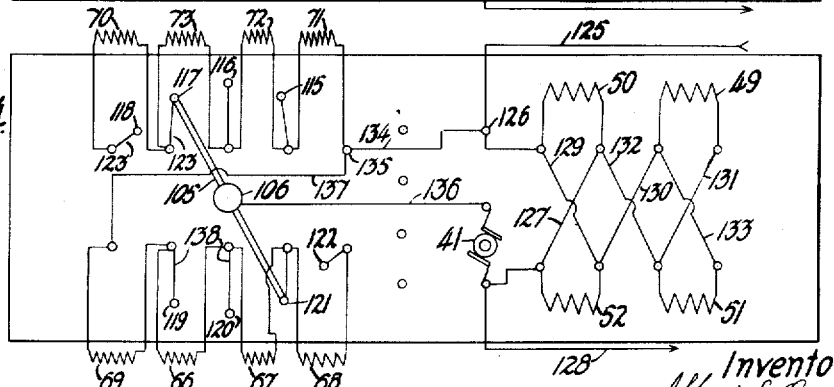

Referring to Figure 14, it will be seen that the current flowing in from the main 125 divides at the terminal 126, part flowing through the parallel field coils, and the remainder flowing through a wire 134 to a terminal 135, where it subdivides, one portion of the subdivided current flowing through the coils 71, 72, 73 and lead 123 to switch-terminal 117, thence through the lever 105, wire 136, armature 41, and thence out through the main 128. The other part of the current subdivided at 135 flows through a wire 137 and auxiliary coils 69, 66 and 67 to switch-terminal 121, and thence through lever 105 and wire 136 to the armature and out to the main 128. The auxiliary coils are connected to oppose the field coils, and their opposition may be reduced without altering the parallel arrangement of the two sets or series of auxiliary coils. It will be noted that the switch leads 138 from the coils 66, 67, 68 are not reversed in their order, as is the case with the leads 124 at Figure 10.

Variations may be resorted to within the scope of the invention, and portions of the improvements may be used without others.

Having thus described my invention, I claim:

1. The combination of an armature, a core device, field coils surrounding the core, auxiliary coils also surrounding the core and opposed to the field coils and connected in series with the armature, provision being made to enable the auxiliary coils to co-operate with the field coils to secure speed regulation of the motor, said field coils being in shunt around the auxiliary coils and armature, said core being annular or continuous, and said auxiliary coils wound around said core, the core being provided with by-passes or loops extending around the auxiliary coils, and a magnetic resistance or impediment common both to the auxiliary coils and to the field coils in parallel therewith, to link all the coils together through the main core to cause equal reaction, provision being made of a movable device for cutting out a circuit of certain auxiliary coils on each of said loops, for changing the speed of the motor.

2. An alternating current motor including an armature coil, auxiliary coils in circuit therewith, field coils connected to be opposed by the auxiliary coils, the field coils connected in shunt around the auxiliary coils and armature coil, a main magnet-core common to the field and auxiliary coils, branch magnet-cores, magnetic impediments between said main and branch magnet-cores, and movable means for cutting certain of the opposing coils out of circuit at will to vary the speed of the motor.

3. An alternating current motor including an armature coil, auxiliary coils in circuit therewith, field coils connected to be opposed by the auxiliary coils, the field coils connected in shunt around the auxiliary coils and armature coil, a main magnet-core common to the field and auxiliary coils, branch magnet-cores, magnetic impediments between said main and branch magnet-cores, the auxiliary coils disposed in two series associated respectively with the field coils, and movable means for cutting out from circuit and auxiliary coil in one series and concomitantly an auxiliary coil in the other series.

4. An alternating current motor including an armature coil, auxiliary coils in circuit therewith, field coils connected to be opposed by the auxiliary coils, the field coils connected in shunt around the auxiliary coils and armature coil, a main magnet-core common to the field and auxiliary coils, branch magnet-cores, magnetic impediments between said main and branch cores, the auxiliary coils disposed in two series associated respectively with the field coils, and a switch-lever to connect one series of auxiliary coils with the other, said lever movable to cut out auxiliary coils from each of said series.

5. An alternating current motor including an armature, separate sets of auxiliary coils in series with the armature, field coils in shunt to the armature and auxiliary coils wound in opposition to the field coils, an endless main magnet-core linking together the field and auxiliary coils, branch magnet-cores, magnetic impediments between said main and branch magnet-cores, and means for cutting out certain sets of auxiliary coils, to increase the effective field strength of the field coils.

6. The combination of a horse-shoe magnet having field coils, auxiliary windings upon said magnet between said field coils, said auxiliary windings working oppositely to the field coils, an armature coil in series with said auxiliary windings, said field coils in shunt around the auxiliary windings and armature, said magnet provided with a loop around said auxiliary windings, and having a magnetic impediment, and movable means for cutting certain of said auxiliary windings out of circuit to increase the speed of the motor.

7. A motor wound for alternating current and having an armature, an annular or continuous magnet, field coils at the poles of the magnet, and connected across the mains, auxiliary coils at the sides of the magnet, said auxiliary coils being connected in series with the armature across the mains, and connected to oppose the field coils and forming the middle portions of the annulus into separate magnets, iron loops or bypasses branching from the annular magnet around the auxiliary coils, and provided with gaps or magnetic impediments, and means for cutting a plurality of said auxiliary coils simultaneously out of circuit to increase the speed of the motor.

8. A motor wound for alternating current and having an armature, an annular or continuous magnet, field coils at the poles of the magnet, and connected across the mains, auxiliary coils at the sides of the magnet, said auxiliary coils being connected in series with the armature across the mains, and connected to oppose the field coils and forming the middle portions of the annulus into separate magnets, and iron loops or bypasses branching from the annular magnet around the auxiliary coils, and provided with gaps or magnetic impediments, said auxiliary coils being divided into parallel sets, movable means being provided for cutting out certain of the auxiliary coils at will.

ALFRED E. OSWALD.